United States Patent [19]

Kassai

[11] Patent Number: 4,799,736
[45] Date of Patent: Jan. 24, 1989

[54] CHILD'S SAFETY SEAT FOR USE IN AUTOMOBILES

[75] Inventor: Kenzou Kassai, Osaka, Japan

[73] Assignee: Aprica Kassai Kabushikikaisha, Osaka, Japan

[21] Appl. No.: 136,491

[22] Filed: Dec. 22, 1987

Related U.S. Application Data

[63] Continuation of Ser. No. 932,684, Nov. 18, 1986, abandoned.

[30] Foreign Application Priority Data

Nov. 29, 1985 [JP] Japan ................................ 60-269894

[51] Int. Cl.⁴ .............................................. A47C 7/00
[52] U.S. Cl. ..................................... 297/440; 297/216
[58] Field of Search ............... 297/440, 464, 441, 457, 297/218; 5/216, 94, 98 R, 98 B, 99 A, 99 B, 100, 403, 405

[56] References Cited

U.S. PATENT DOCUMENTS

| | | | |
|---|---|---|---|
| 2,957,219 | 10/1960 | Van Buren, Jr. | 5/403 X |
| 3,891,267 | 6/1975 | Taylor | 297/440 X |
| 4,047,755 | 9/1977 | McDonald et al. | 297/216 |
| 4,062,589 | 12/1977 | Klein et al. | 297/440 X |
| 4,188,065 | 2/1980 | Meeker | 297/441 X |
| 4,305,616 | 12/1981 | Martinez | 297/440 |
| 4,311,339 | 1/1982 | Heath | 297/216 X |
| 4,339,149 | 7/1982 | Nakao et al. | 297/216 X |
| 4,510,634 | 4/1985 | Diedrich et al. | 297/464 X |
| 4,603,903 | 8/1986 | Moscovitch | 297/440 X |

FOREIGN PATENT DOCUMENTS

| | | | |
|---|---|---|---|
| 0169909 | 12/1985 | European Pat. Off. | 297/464 |
| 0168966 | 1/1986 | European Pat. Off. | 297/216 |
| 7515104 | 6/1976 | Netherlands | 297/216 |
| 1384322 | 2/1975 | United Kingdom | 297/216 |
| 2136685 | 9/1984 | United Kingdom | 297/464 |

Primary Examiner—Peter A. Aschenbrenner
Assistant Examiner—Jose V. Chen
Attorney, Agent, or Firm—W. G. Fasse; D. H. Kane, Jr.

[57] ABSTRACT

A child's safety seat for use in automobiles has a chair type safety seat body formed by a resin molding including a seat portion, a backrest portion and a pair of lateral wall portions rising upwardly and forwardly respectively from the seat and backrest portions. Each lateral wall portion has an edge which is turned back while forming a U-shaped cross section with a substantially uniform wall thickness. The turned-back edge has downwardly and rearwardly directed sections. Outer lateral wall attachments made by a resin molding separately from the safety seat body are secured to the safety seat body in such a manner that a continuous outer surface is obtained. These attachments connect to the free turned-back edges of the lateral wall portions and extend to the rear ends of the lateral wall portions.

5 Claims, 3 Drawing Sheets

CHILD'S SAFETY SEAT FOR USE IN AUTOMOBILES

This application is a continuation, of application Ser. No. 932,684, filed Nov. 18, 1986, now abandoned.

BACKGROUND OF THE INVENTION

1. Field of the Invention

This invention relates to a child's safety seat for use in automobiles. The seat is provided with a chair type safety seat body formed by a resin molding. More particularly, the invention relates to an assembly construction for a child's safety seat.

2. Description of the Prior Art

A child's safety seat for use in automobiles is adapted to be firmly fixed on the seat of an automobile by utilizing the seat belt furnished in the automobile. Therefore, the baby's or child's body firmly held by this child's safety seat for use in automobiles will remain in the fixed position when the automobile is quickly braked or is going around a sharp curve or even when the automobile is involved in a collision accident; thus, such child's safety seat is desirable from the standpoint of safety.

Such child's safety seats for use in automobiles are often provided with a chair type safety seat body obtained by a resin molding. Usually, this safety seat body comprises a seat portion, a backrest portion, and a pair of lateral wall members rising upward and forward respectively from the sides of the seat and backrest portions. Such safety seat body usually is covered by a fabric applied thereto directly or on a suitable intermediate cushion material.

The pair of lateral wall portions for safety seat bodies as described above, is sometimes shaped to form armrests. In other cases, the lateral walls are shaped as guards for protecting the head of a baby or child sitting on the safety seat. When the lateral wall portions serve as armrests they must have a predetermined width. The portion of any lateral wall serving as a head guard must have a smooth finish especially at any projecting end thereof. Hence, such end must have a predetermined width.

In the safety seat body obtained by a resin molding, as described above, when the free end of each lateral wall portion must have a predetermined width, a method might be contemplated of increasing the thickness of each lateral wall, particularly the portion adjacent the free end. However, such method is not preferable as it requires a large amount of resin material, not only adding to the weight of the safety seat but also requiring substantial time in setting or curing the resin while involving the problem of undesirable deformations following the setting of the resin.

Thus, to obtain a predetermined width as described above, outwardly turning back the free end portion of each lateral wall to form a U-shaped cross section might be contemplated as a preferable method. More particularly, the idea is to bring about a predetermined width by means of the turned-back free end portion of the lateral walls. In this case, the lateral wall portion can be formed of resin to have a substantially constant wall thickness.

The turned-back portion described above, which is shaped to have a rearwardly or downwardly opened section, has its terminal end positioned short of the rear end of each lateral wall. As a result, the opposite outer lateral surfaces of the safety seat body have stepped sections formed by the turned-back portions, a fact which is not undesirable in terms of external appearance. However, clearances in such stepped sections, or more concretely clearances defined in the terminal end edges of the turned-back portions and between the terminal end edges thereof and the main portions of the lateral wall portions sometimes cause an injury.

SUMMARY OF THE INVENTION

Accordingly, this invention is intended to solve the problems caused by the presence of the aforesaid turned-back portions.

This invention provides a child's safety seat for use in automobiles comprising a chair type safety seat body obtained by a resin molding, said safety seat body having a backrest portion, a seat portion and a pair of lateral wall portions rising upwardly and forwardly respectively from the lateral portions of said seat and backrest portions, wherein each lateral wall portion has an end portion outwardly turned back while forming a U-shaped cross section with a substantially uniform wall thickness, said end portion being formed with downwardly and rearwardly directed free end edges, the aforesaid technical problems being solved as follows:

Outer lateral wall attachments obtained by a resin molding separately of the safety seat body, are attached to the safety seat body in such a manner that rearwardly extending surfaces are connected to the free end edges of the lateral wall portions.

According to this invention, each outer lateral wall attachment fills the stepped sections defined by the turned-back portion of the lateral walls and forms a surface substantially flush with the outwardly extending turned-back portion. Therefore, the outer surface of the safety seat body has a smooth shape as a whole, forming a preferable appearance and eliminating the problem of any injury described above.

Since the lateral wall portion is sometimes covered by a cover material, the end edge of said cover material may, when necessary, be turned back along the free end edge of the lateral wall portion and the end of the outer lateral wall attachment may be used to hold down the cover material. More specifically, the outer lateral wall attachment is constructed to perform two function of hiding the unsightly end edge of the cover material and holding the same in position.

Further, since the outer lateral wall attachment is separately produced by a resin molding, it is easy to change its design or provide a relatively complicated shape. Further, this outer lateral wall attachment may be used to influence the aesthetic impression of the safety seat. In other words, by changing only the design of the outer lateral wall attachment, it is easy to produce a variety of safety seats or to remodel a used seat.

DESCRIPTION OF THE PREFERRED EXAMPLE EMBODIMENTS AND OF THE BEST MODE OF THE INVENTION

Figure 1:
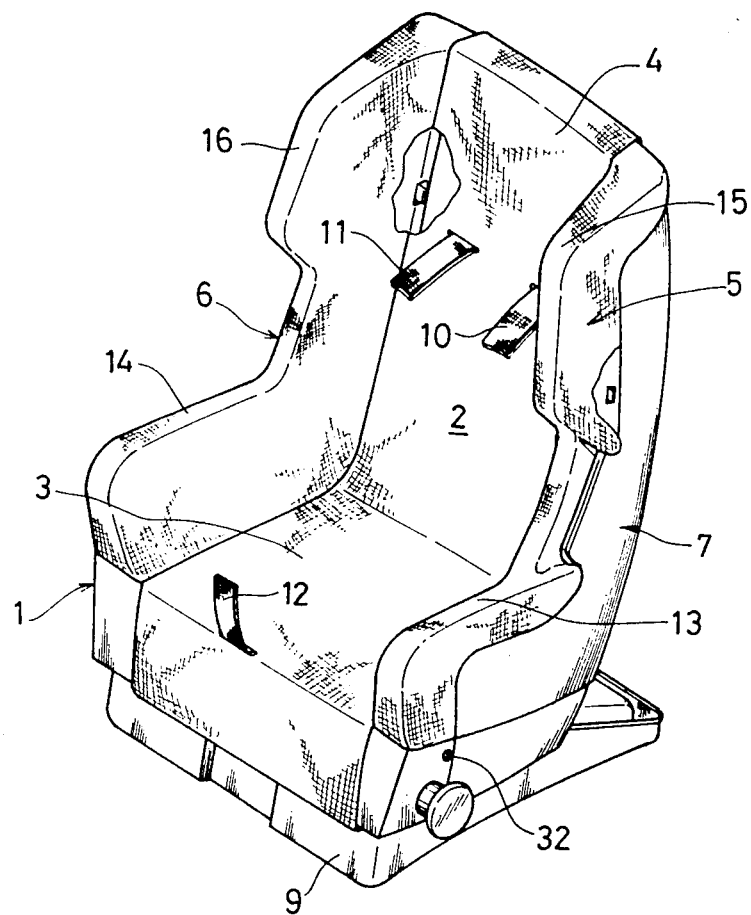
FIG. 1 is a perspective view showing the external appearance of an embodiment of the invention.

A child's safety seat for use in automobiles shown in FIG. 1 comprises a chair type safety seat body 1 obtained by a resin molding. The safety seat body 1 is totally covered by a cover material 2. In addition, a suitable cushion material is interposed between the cover material 2 and the safety seat body 1. The safety seat body 1 comprises a seat portion 3, a backrest portion 4 and a pair of lateral wall portions 5 and 6 rising upwardly and forwardly respectively from the lateral portions of the seat and backrest portions 3 and 4. In addition, in FIG. 1 and in FIG. 2 to be described below, it should be pointed out that, although lead lines for the aforesaid seat portion 3, backrest portion 4 and lateral wall portions 5 and 6 are drawn to the surface of the cover material 2, these portions are actually disposed under the cover material 2.

Figure 2:
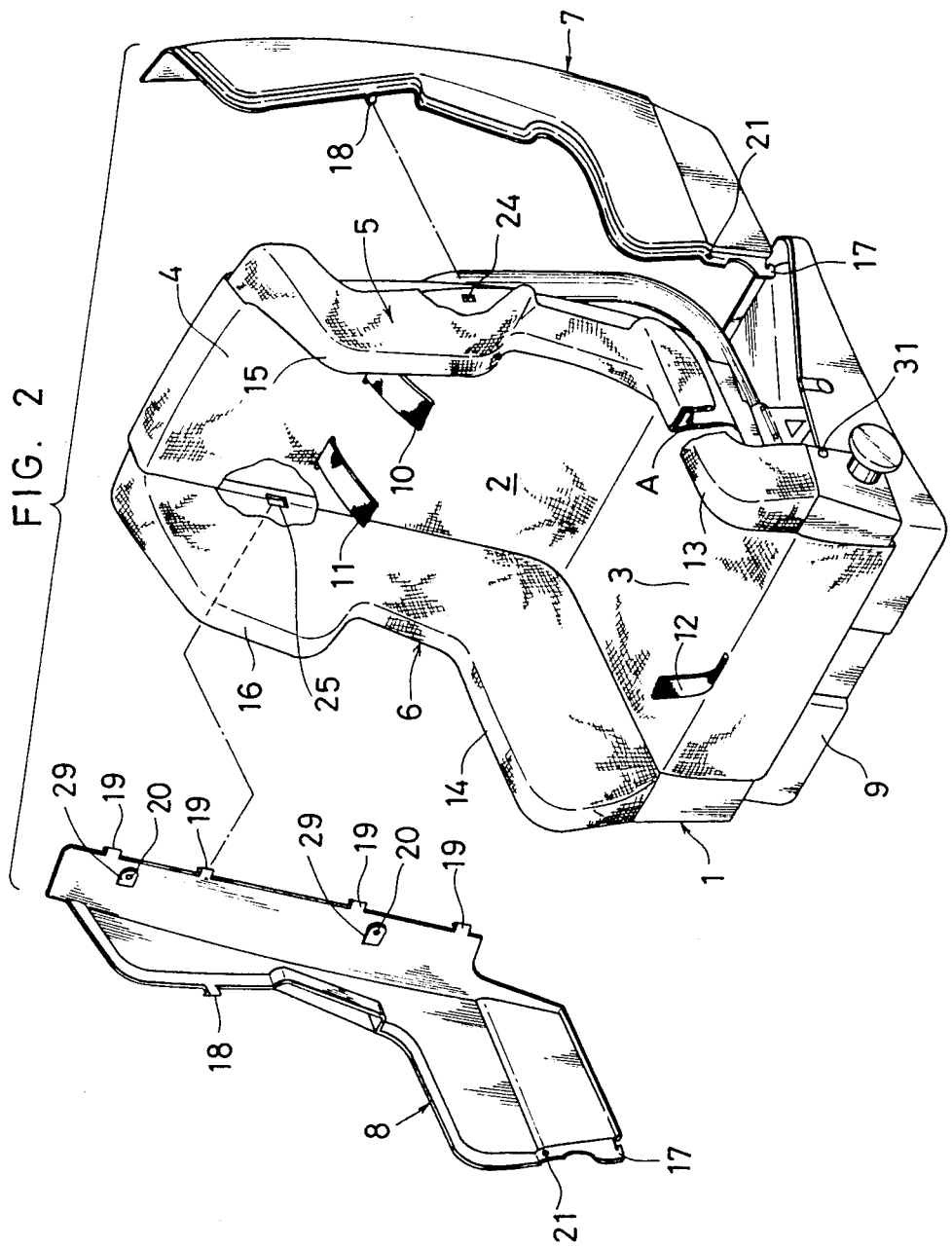
FIG. 2 is a respective view showing outer lateral wall attachments for a child's safety seat for use in automobiles, separated from a seat body.

In FIG. 1, one outer lateral wall attachment 7 characteristic of the invention is shown. FIG. 2 is a perspective view of both outer lateral wall attachments 7 and 8 shown separated from the safety seat body 1. The method of attaching the outer lateral wall attachments 7 and 8 to the safety seat body 1 will be described below with reference to FIGS. 3 to 5.

As shown in FIGS. 1 and 2, the child's safety seat for use in automobiles has a base 9 for supporting the seat. The present seat also has safety belts 10, 11 and 12 for tying down the body of a baby or child.

The lateral wall portions 5 and 6 of the safety seat body 1 and their downwardly open edges are shown in FIG. 2, with one lateral wall portion 5 shown partly broken away to show the open edge. As indicated at A, the open edge is turned back to form a U-shaped cross section with a substantially uniform wall thickness. The formation of the turned-back portions A results both in forming the lateral wall portions 5 and 6 with relatively wide surfaces serving as armrests 13 and 14 and in imparting smooth bulges to the free edges of the head guards 15 and 16 for protecting the head.

The free end edges of the turned-back portions A form a contoured U-channel which is open downwardly and backwardly and positioned short of the rear ends of the lateral wall portions 5 and 6. The outer lateral wall attachments or panels 7 and 8 are secured to the safety seat body 1 in such a manner as to extend to the rear ends of the lateral wall portion 5 and 6. The panels 7 and 8 have an approximately forwardly facing edge contoured to match the contour of the contoured U-channel for merging with the open U-channel formed by the turned-back portions A for procuding an effectively uninterrupted outer wall surface. These outer lateral wall attachments 5 and 6 are produced by a resin molding. The U-channel as shown at A in FIG. 2 has a first leg merging into the respective lateral wall portion 5 or 6 and a second leg forming a downwardly and rearwardly directed free edge.

The outer lateral wall attachments 7 and 8 have means by which they are secured to the safety seat body 1. In FIG. 2, such securing means are shown but in the right-hand side outer lateral wall attachment 7, some of the attaching means are hidden by said outer lateral wall attachment 7 itself. However, since the outer lateral wall attachments 7 and 8 are mirror symmetrical with respect to each other, the positions and shapes of the securing means for the two outer lateral wall attachments 7 and 8 will be readily understood from the following description of the two outer lateral wall attachments 7 and 8. In addition, in the two outer lateral wall attachments 7 and 8, the same securing means are indicated by the same reference numerals.

Each of the outer lateral wall attachments 7 and 8 is provided at its front lower end with a hook 17 and at its front end edge with a projection 18. Each of their rear end edges is provided with a plurality of projections 19. Further, two attaching holes 20 are formed somewhat inwardly of each rear end. These holes 20 are disposed one above the other. A relatively lower region of each front end edge has an attaching hole 21. Attaching means in the safety seat body are respectively paired with the hooks 17, projections 18, 19 and attaching holes 20, 21.

Figure 3:
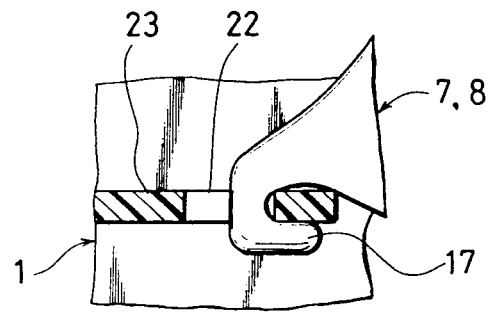
FIG. 3 is an enlarged fragmentary view, partly in section, of an attaching region using a hook shown in FIG. 2.

In securing the outer lateral wall attachments 7 and 8 to the safety seat body 1, first, the hook 17 is engaged with the hole 22, as shown in FIG. 3, formed in the safety seat body 1. The hole 22 is hidden and cannot be shown in FIG. 2 but is formed in a wall 23 connected to the turned-back portion A.

Figure 4:
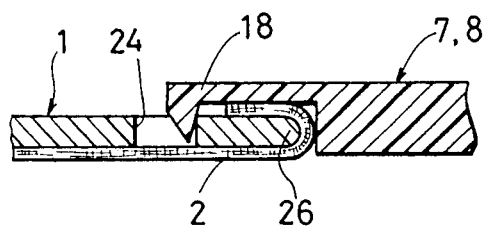
FIG. 4 is an enlarged sectional view showing the state of engagement between a projection and a hole shown in FIG. 2.

Then, the projections 18 and 19 are engaged with the peripheral portions of holes 24 and 25 formed in the safety seat body 1 shown in FIG. 2. Only one of the holes 25 corresponding to the projections 19 is shown in FIG. 2 with part of the cover material 2 removed, but similar holes are provided correspondingly to the projections 19. In FIG. 4, the state in which the projection 18 is engaged with the peripheral portion of the hole 24 is shown in an enlarged cross-sectional view. The projection 18 is adapted to form a snap joint with the peripheral portion of the hole 24 while being elastically deformed. Such snap joint is also attained by the combination of the projection 19 and hole 25 in substantially the same manner as in the state shown in FIG. 4. When such snap joint is established between the projections 18 and the holes 24 and between the projections 19 and the holes 25, the outer lateral wall attachments 7 and 8 are secured to the safety seat body 1, as shown in FIG. 1.

In addition, as best shown in FIG. 4, the end edge of the cover material 2 is turned back along the free end edge 26 of the turned-back portion A. The ends of the outer lateral wall attachments 7 and 8 are positioned to hold down the end edge of the cover material 2 in place.

Figure 5:
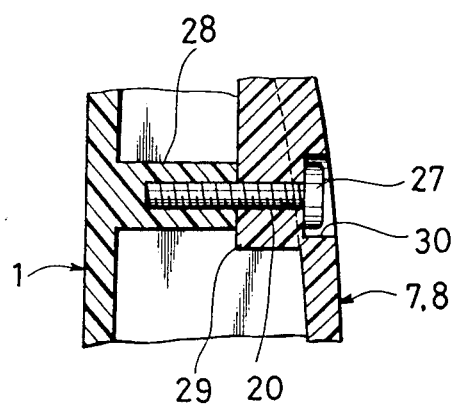
FIG. 5 is an enlarged sectional view of an attaching region related to an attaching hole shown in FIG. 2.

To make the secured state of the outer lateral wall attachments 7 and 8 even more positive, a screw 27 is used, as shown in FIG. 5. In FIG. 5, the region where the attaching hole 20 for the outer lateral wall attachments 7 and 8 is formed, is shown in an enlarged cross-sectional view. The screw 27 inserted through the attaching hole 20 is threadedly engaged with an attaching boss 28 provided on the safety seat body 1. Each boss also functions as a spacer member as shown in FIG. 5. In addition, each of the outer lateral wall attachments 7 and 8 may be formed with a thick walled portion 29 to ensure the greatest securing effect of and a stable contact between the attaching boss 28 and the screw 27. Further, a recess 30 may be provided for the head of the screw 27 so that it does not project beyond the respective outer lateral wall attachments 7 and 8.

As shown in FIG. 2, an attaching hole 31 is formed in the front lower end portion of the safety seat body 1. The hole 31 corresponds to the attaching hole 21. A screw 32 as shown in FIG. 1 is threadedly engaged with these attaching holes 21 and 31.

The screws 27 or 32 may be tapping screws.

As indicated by one outer lateral wall attachment 7 in FIG. 1, the outer lateral wall attachments 7 and 8 are firmly attached to the safety seat body 1. When so attached, the outer lateral wall attachments 7 and 8 are substantially flush with the turned-back portions A of the safety seat body 1 to provide a smooth outer lateral surface.

In the embodiment described above, the outer lateral wall attachments 7 and 8 have been secured to the safety seat body 1 by the snap joint including holes 24, 25 and the projections 18, 19 adapted for elastic engagement with the peripheral portions thereof, by the combination of the holes 22 and the hooks 17 adapted for engagement with the holes, and by the use of the screws 27 and 32; however, one of these attaching means may be omitted. Further, attaching means other than those illustrated, for example, an adhesive may be used to secure the outer lateral wall attachments 7 and 8 to the safety seat body 1.

In the illustrated embodiment, a pair of single outer lateral wall attachments 7 and 8 have been used on opposited sides; however, a plurality of segments to form each outer lateral wall attachment may be made for each side and secured to the safety seat body 1.

Although the present invention has been described and illustrated in detail, it is clearly understood that the same is by way of illustration and example only and is not to be taken by way of limitation, the scope of the present invention being limited only by the terms of the appended claims.

What is claimed is:

1. A child's safety seat for use in automobiles, comprising a chair type safety seat body made by a resin molding and having a seat portion, a backrest portion, and a pair of lateral wall portions rising upwardly and forwardly respectively from said seat portion and from said backrest portion, each of said lateral wall portions comprising an initially downwardly and rearwardly open channel forming an edge section of the respective lateral wall portion, said initially downwardly and rearwardly open channel having a contour with a U-shaped cross-section extending substantially continuously along said seat portion and along said backrest portion, said U-shaped cross-section having a first leg merging into the respective lateral wall portion and a second leg forming a downwardly and rearwardly directed free edge, initially separate outer lateral wall attachment panels made by a resin molding separately from said safety seat body, each of said initially separate attachment panels having an approximately forwardly facing rim contoured to match said contour of said initially open channel of the respective lateral wall portion, so that said second leg and said initially separate panels together form an outer chair surface extending substantially uninterrupted from said free edge to rear ends of said lateral wall portions, so that an outwardly facing surface of said second leg extends substantially in a same plane as an outwardly facing surface of the respective initially separate panel, and means for securing said initially separate outer lateral wall attachment panels to said safety seat body in such a position that said forwardly facing contoured rims of said initially separate attachment panels fit with the respective free edge of said second leg of said U-shaped cross-section of the respective lateral wall portion in said seat body to provide a substantially uninterrupted outer chair surface which substantially completely closes said initially open channel of said U-shaped cross-section.

2. The child's safety seat of claim 1, wherein said securing means comprise snap joint means including a combination of holes and projections adapted for an elastic engagement with each other.

3. The child's safety seat of claim 1, wherein said securing means include engaging means comprising a hole and a hook adapted for engagement with each other.

4. The child's safety seat of claim 1, wherein said securing means include screw means, and wherein said lateral wall portions have spacer bosses (28) into which said screw means extend.

5. The child's safety seat of claim 1, further comprising a cover material for covering said lateral wall portions, said cover material having an edge turned back along said free edges and clamped between said outer lateral wall attachment panels and said edge section of said U-shaped channel.

* * * * *